July 30, 1935. F. H. RICHTERKESSING 2,009,636
TROLLEY FROG OPERATING SYSTEM
Filed July 29, 1932 2 Sheets-Sheet 1

Inventor
FRANK H. RICHTERKESSING
By John L. Miltau.
Attorney

Fig.3

Patented July 30, 1935

2,009,636

UNITED STATES PATENT OFFICE 2,009,636

TROLLEY FROG OPERATING SYSTEM

Frank H. Richterkessing, Louisville, Ky.

Application July 29, 1932, Serial No. 626,242

31 Claims. (Cl. 191—33)

My invention relates to a system for automatically controlling an electrically operated trolley frog tongue device ordinarily employed to direct the course of travel of overhead current collectors.

One of the objects of my invention is to make provision for supplementing the frog tongue devices with electrical contacts to control the display of signal indications whereby the vehicle operator may be informed of the position to which the frog tongues have been actuated.

Another object of my invention is to provide a system which eliminates the necessity of employing an auxiliary control device to control the energization of the frog tongue operating mechanism.

A still further object of my invention is to provide a system wherein the positioning of the frog tongue devices may be automatically controlled from the vehicle through the well known principle of power on and power off to the operating motors of a vehicle. The system being so arranged that an operator of the vehicle may at will control the positioning of the movable tongues to either of their operable positions. For instance, a vehicle approaching the frog tongue devices and operating with power on its motors, will operate or hold the tongues in a predetermined position. Likewise a vehicle approaching the frog tongue devices and operating with power off its motors will result in the tongues being operated or held in their other operable position.

Other objects will disclose themselves as the description of my invention is made herein.

My invention resides in the new and novel construction, the combination and relation of the various parts and circuits herein described and shown in the drawings, in which—

It is the object of my invention to provide a system or means by which trolley frog tongue devices are automatically and electrically actuated to the straight ahead or curved positions governed by the vehicle operator applying either power on or power off to the operating motors of his vehicle. This system utilizes the principle that when the motor controller is set in the power off position no current will flow through the motors and when the controller is moved to the power on position a heavy current will flow through the vehicle motors. The flow and non-flow of the motor operating current is made use of in the operation of the system for selecting the position of the trolley frog tongue devices. There are other currents employed in trackless trolley vehicles which must be taken into account in the designing of the system and these are referred to as the auxiliary circuits and are known as the light, heat and air compressor circuits.

Figure 1:
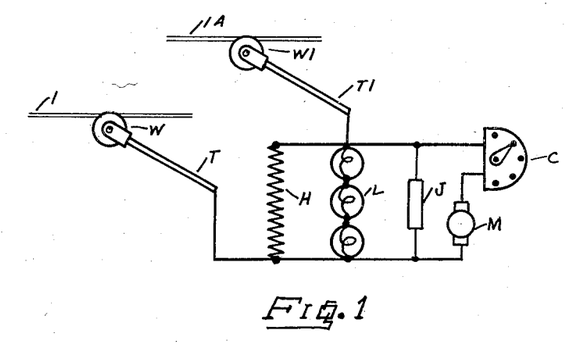
Figure 1 is a diagrammatic scheme of the circuits ordinarily employed in a vehicle collecting its operating current from two overhead current collectors, and which are taken into account in the operation of my invention more fully described and disclosed hereinafter.

In Fig. 1 the characters W and W1 represent current collectors or trolley wheels employed on vehicles for collecting their motive power from two overhead current collectors as is the case with trackless trolley vehicles. Characters T and T1 represent the trolley poles by which the respective current collectors are mounted upon the vehicle. H indicates the heaters, L the lights, J the air compressors and these, when in operation, constitute the current ordinarily referred to as the auxiliary operating currents. The motor for driving the vehicles are indicated by the letter M and the controller for regulating the current flowing into the motor circuit is represented by the character C. Normally the current collector W is in contact engagement with the overhead current conductor I and the current collector W1 is in contact engagement with the overhead conductor IA.

Figure 2:
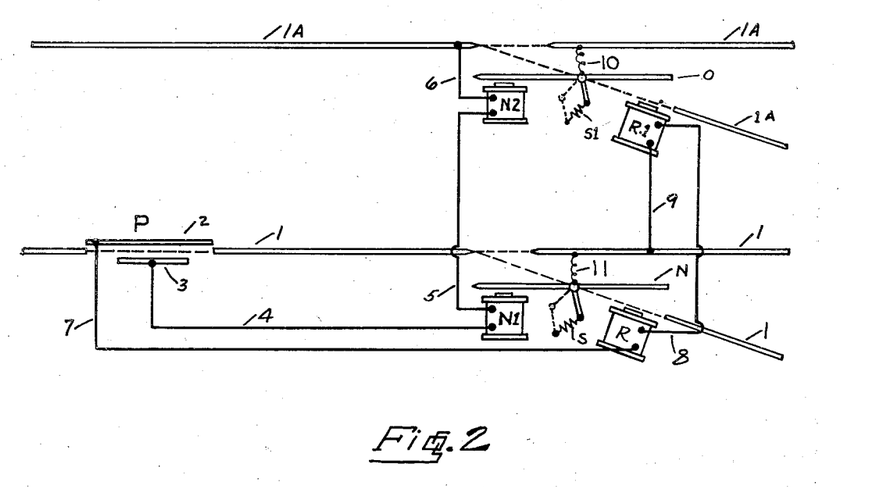
Fig. 2 is a diagrammatic drawing of my invention illustrating the relation of the various parts and circuits when the system is in a normal condition. The frog tongue devices, however, may be shown in either of their operable positions.

In the system shown in Fig. 2 the letter P represents a trolley pan or contactor positioned adjacent the current conductor I and it is so arranged that when the current collector W comes into contact engagement with the contact members 2 and 3, it will pass out of contact engagement with the overhead current conductor I. The contact members 2 and 3, as shown in Fig. 2, are shown as being of unequal lengths disposed in a symmetrical relation to one another. This arrangement, however, as is well known to those versed in the art, may be changed without contributing to the principle of operating the system. It is very obvious that the contact members 2 and 3 can be so arranged as to be approached simultaneously as the collector W disengages the current conductor 1, in which event the collector W would remain in contact engagement with the contact member 2 after disengaging the contact member 3 and remain out of contact engagement with the current conductor 1; or it may be desirable to so arrange the contact members 2 and 3 that the current collector W will remain in contact engagement with the current conductor, while engaging the contact member 3 and not engaging the contact member 2 until after disengaging the contact member 3 in which event the current collector W will run out of contact engagement with the current conductor 1 while the collector engages the contact member 2. The possible advantage of such an arrangement may be that each of the frog operating circuits are energized independent of the other circuit. It is also very obvious to those skilled in the art that it is possible and practical to employ separate trolley contactors in each of the overhead conductors 1 and 1A to control each frog tongue device independently of the other. This arrangement would obviate the necessity of maintaining electrical connections between the frog tongue devices.

The trolley pan P, as shown in Fig. 2, is of a construction which is well known to those skilled in the art and is practically considered as being the standard arrangement and disposition of electrical parts and for this reason is selected in the modification disclosed to illustrate operation of my invention.

Figure 3:
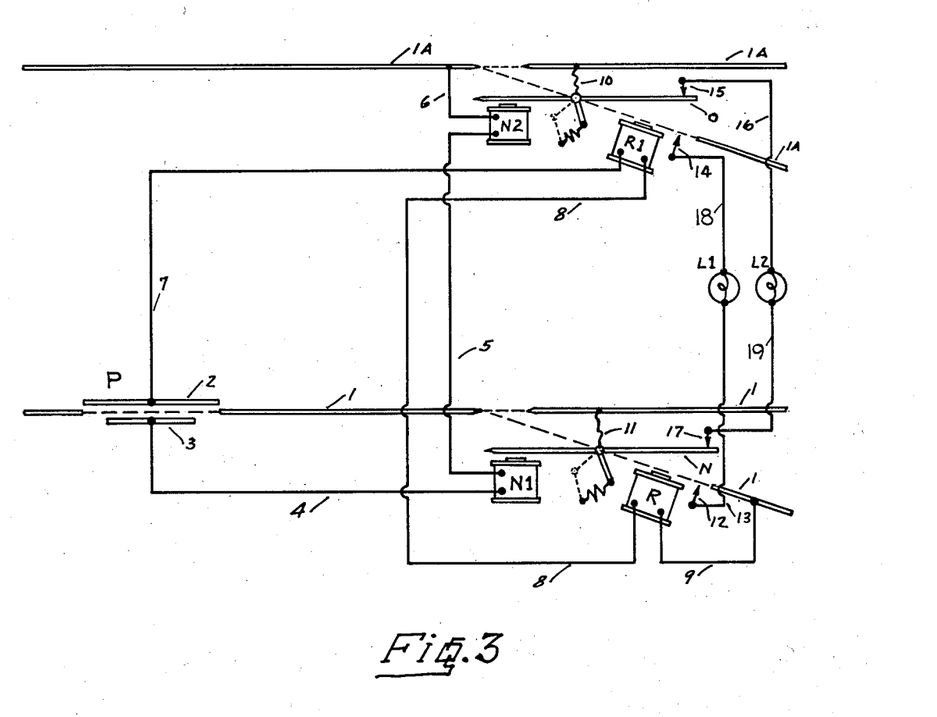
Fig. 3 is a modification of Fig. 2 disclosing the manner in which signal indications can be controlled directly from suitable contacts controlled by the actual position of the trolley frog tongues.

Since the propulsion current of the vehicle is obtained from two overhead current collectors separate frog tongue switching devices are required for each current conductor. In Figs. 2 and 3 the electrically operated frog tongues N and O are identical and like numerals and characters have been employed to designate corresponding parts.

With further reference to Fig. 2 it will be noted that the switch tongue N is employed to govern the direction of the current collector W traveling on the current conductor 1, and the switch tongue O is employed to govern the direction of travel of the current collector W1 traveling on the overhead conductor 1A. The switch tongue O is provided with two operating coils N2 and R1 and a suitable toggle spring mechanism S1 for mechanically biasing the position of the switch tongue O after it has been actuated to either of its operable positions. The operating coil N2 is employed to position the switch tongue O so as to cause the current collector W1 to continue in a straight ahead travel and the operating coil R1 is employed to operate the switch tongue O to a position so as to cause the current collector W1 to select the curved route.

The frog tongue N mounted in the overhead conductor 1 is similarly provided with two operating coils N1 and R and a suitable toggle spring mechanism S for mechanically biasing the frog tongue N. The operating coil N1 is employed to operate the tongue N to such a position as to cause the current collector W to travel in the straight ahead course while the operating coil R is employed to operate the switch tongue N to such a position as to cause the collector W to select the curved position. The operating coils N1 and N2 usually consist of a large number of turns of a relatively small size of wire to maintain the current flowing in this circuit at a small practical value. The coils, as shown, are connected in series so that a current flowing in the circuit will cause the frog tongue to move to that relative position. It is obvious to those skilled in the art, however, that the coils N1 and N2 may be connected in a multiple circuit. The operating coils R and R1 employed for selecting the curved position are likewise arranged in the series circuit and so connected to the contact member 2 of trolley contactor P so that it will be placed in series with the operating motors of the vehicle when the collector W engages the contact member 2. Since these coils must withstand the flow of a large amount of current they consist of a few turns of a relatively large size of wire, approximately 6 or 8 turns of #4 or #5 copper wire.

In Fig. 3 the system shown in Fig. 2 has been modified to show the manner in which signal light indications can be added to the system to indicate the actual position of the frog tongue devices. The signal circuit and arrangement, although very simple in nature and construction, is very novel in its operation inasmuch as a relatively high degree of safety is maintained in the operation of the circuits. The signal system is so arranged that both frog tongues must be actuated to their respective proper positions in order that the signal circuit indicating that tongue position be completed. In the event that one tongue is properly actuated to this position while the other tongue remains unaffected or in some mid-position through some mechanical failure such as may be the case encountered in actual service neither signal indication will be illuminated since the signal circuit will not be properly completed. Under this arrangement it will be noted that the "non-burning" of the signal indication indicates to the vehicle operator that the system is not in a proper operating condition. The same condition will likewise exist should either of the signal circuits become open, or any of the controlling contacts become damaged, or by the signal lamp "burning-out". In this manner it can be seen that it will be necessary for the signal circuits to be in an operating condition before the proper signal can be displayed.

In describing the operation of the invention it is believed that a lengthy description of Fig. 2 may be omitted since Fig. 3 is identical in operation except that signal indications have been added. Therefore, only a further description and disclosure of Fig. 3 is hereinafter made.

In Fig. 3 when the current collector W engages the trolley contactor P with power on the frog tongues N and O will be electrically actuated to the curved position since a current of sufficient magnitude will flow in the operating circuit of the coils R and R1 to properly energize the coils and actuate their respective switch tongues. This energization of the operating coils R and R1 will be maintained as long as the current collector W is in contact engagement with the contact member 2 and as long as the controller of the vehicle is in the power on position. Therefore, it can be readily understood that frog tongue will positively remain in the curved position when the current collector W disengages the contact member 2 since the operating coils R and R1 will be the last coils energized when the collector disengages the contactor P. The system in actual service is arranged so that the energization of the operating coils N1 and N2 will not affect an operation of the frog tongues N and O when the tongues have been initially actuated by the power on application, and the high energization of operating coils R and R1 is maintained through the flow of motor operating current through these coils. By further reference to Fig. 3 it will be noted that the operating coils R and R1 are energized under the control of the operator of the vehicle, when the current collector initially engages the contact member 2 with power on. It will likewise be noted that the operating coils N1 and N2 are energized independently of the control of the operator when the current collector of the vehicle engages the contact member 3. As indicated in Fig. 3, the operating coils R and R1 are employed to shift the frog tongues to the "curve" position. Therefore, an operator of a vehicle desiring to take the "curve" route, will place his controller in the power on position. When the current collector engages the contact member 2, the operating coils R and R1 will be sufficiently energized and the frog tongues operated to the "curve" position. As the collector continues and engages contact member 3, the operating coils N1 and N2 will be energized, but due to the energization of operating coils R and R1 and the initial operation of the frog tongues N and O to the curve position, this energization of operating coils N1 and N2 will have no effect on the frog tongues N and O. However, if the operator of the vehicle places his controller in the power off position while the current collector remains in engagement with the contact member 3, the operating coils R1 and R will be de-energized and because of the energization of operating coils N1 and N2, the frog tongues will immediately operate to the "straight ahead" position. If the current collector of the vehicle initially engages the contact member 2 with power off the motors, the operating coils R and R1 will not be energized, and no operation of the frog tongue devices will take place at this time. As the moving vehicle continues, however, and the current collector engages the contact member 3 with the controller still in the power off position, the operating coils N1 and N2 will be energized and the frog tongues will be positioned for the "straight ahead" route. If the operator of the vehicle shifts the controller to the power on position while the collector is in engagement with contact member 3, usually no further operation of the frog tongues will occur. However, as soon as the collector disengages the contact member 3, and continues in engagement with the contact member 2 the frog tongues will be shifted to the "curved route". However, it is well known to those familiar with the art, that since the degree of energization of the operating coils R and R1 is entirely under the control of the operator of the vehicle, that an extremely high energization of these coils will overcome the effect of operating coils N1 and N2 on the tongues, and cause an operation of the tongues to the "curve" position even though the current collector remains in engagement with contact member 3. It will therefore be noted that the operation of the frog tongues to either the "curved" or "straight ahead" route, is entirely at the will of the motorman; that he can affect an operation of the frog tongues to either the "curve" or "straight ahead" position as long as his current collector is in engagement with the trolley contactor P by merely placing his controller in either the power on or power off position. It can be further seen that in normal operation, when the operator has definitely decided on which route to select, that he will merely place his controller to the desired position and that only a single operation of the frog tongue will occur, that is, if the frog tongues are in the "curve" position and the collector engages the contactor with power off, the frog tongues will be shifted and maintained in the straight ahead position, however, if the tongues were initially in the "straight ahead" position and the collector engaged the contact elements 2 and 3 with power off, no operation of the movable tongues would occur. If the frog tongues were in the "curve" position and the collector engaged the contact elements 2 and 3 with power on, no operation of the frog tongues would occur. However, if the tongues were set for the "straight ahead" position and the collector engaged the contact elements 2 and 3 with power on, the frog tongues would be shifted and held in the "curve" position. It will be obvious to those familiar with the art that this system has many operating advantages over the customary lineally disposed contact elements which usually places the contact element 3 of applicant's system so that it will be engaged in advance, and independently of applicant's contact element 2. It will be noted that when each of the frog tongues N and O are properly actuated to the curve position the circuit for signal lamp L1 will be completed and the operator will be informed of this operation. The circuit for the signal lamp L1 will be completed from the positive wire 1, through flexible connection 11, frog tongue N, contact 12, wire 13, signal lamp L1, wire 18, contact 14, frog tongue O, flexible connection 10 to the ground return current conductor 1A.

If the current conductor W initially engages the trolley contactor P with the controller of the vehicle in the power off position the operating coil R and R1 will not be sufficiently energized to affect the respective frog tongues N and O but when the collector engages the contact member 3 of trolley contactor P a circuit will be completed independent of the magnitude of the current flowing in the vehicle motor circuits for sufficiently energizing the operating coils N1 and N2 to cause the respective frog tongues N and O to move to the straight ahead position. This circuit will be completed from the trolley wire 1, through wire 9, operating coil R, wire 8, operating coil R1, wire 7, contact member 2 of trolley contactor P, through the current collector W, contact member 3 of trolley contactor P, wire 4, operating coil N1, wire 5, operating coil N2, wire 6 to the ground return current conductor 1A. As the current collector disengages the contact member 3 it will remain in contact engagement with the contact member 2 before returning into engagement with the conductor 1. However, no repeated operation of the frog tongues N and O will occur since the controller of the vehicle is in the power off position and a current of sufficient magnitude will not flow through the operating coils R and R1 to properly energize them. The circuit for the energization of the operating coils R and R1 is completed (when the collector W is in contact engagement with the contact member 2 of trolley contactor P, and the controller of the vehicle is in the power on position) from the positive current conductor 1, through wire 9, operating coil R, operating coil R1, wire 7, contact member 2 of trolley contactor P, through current collector W, trolley pole T, vehicle motor M, vehicle controller C, through pole T1, current collector W1 to the ground return current conductor 1A. When the frog tongues N and O are properly actuated to the straight ahead position a circuit will be completed from the energization of the signal lamp L2. This circuit will be completed from the positive current conductor 1, through the flexible connector 11, frog tongue N, contact 17, wire 19, signal lamp L2, wire 16, contact 15, frog tongue O, flexible connector 10, to the ground return conductor 1A.

There are, of course, other modifications and arrangements of the parts and circuits from that heretofore mentioned which may be made from that shown in the accompanying drawings and description describing my invention which I believe will still fall within the scope of my invention.

I claim:—

1. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, electrically operated mechanism controlled by the moving vehicle approaching the said frog tongue devices to operate the movable elements in one direction when operating with "power on" the motors and in the other direction when the vehicle is operated with "power off" the motors, said mechanism comprising operating coils to be energized only when the vehicle is operated with "power on" the motors, and other operating coils connected to be energized in response to the approaching vehicle, regardless of whether the vehicle operates with "power on" or "power off" the vehicle motors, and means for rendering the second mentioned operating coils ineffective to operate the mechanism when the said mechanism is responsive to the energization of the first mentioned coils by a vehicle operating with "power on" the motors.

2. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, electro-magnetic operated mechanism to operate the movable elements, a pair of spaced parallel contact elements included in one of the said power lines and positioned to be engaged by one of the said current collectors approaching the frog tongue devices to control the operation of the said mechanism, of means controlled by engagement of the said current collector with each of the said contact elements to affect the said electro-magnetic mechanism and automatically set the said movable elements to one position when the vehicle is operating with "power off" to the motors, means affecting the said electro-magnetic mechanism while the said current collector is in engagement with one of said contact elements and out of engagement with the other of said contact elements for automatically operating the movable elements to another position only when the vehicle is operated with "power on" the motors, and means rendering the said mechanism ineffective to the engagement of the current collector with each contact element to set the movable elements in the said one position, when the mechanism is initially responsive to a vehicle operating with "power on" the vehicle motors.

3. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, electro-magnetic operated mechanism to operate the said movable elements to different positions, a pair of spaced parallel contact elements consisting of a long element and a short element positioned so that a current collector will first engage the long element and engage the short element while in engagement with the said long element, of means controlled by the engagement of one of the said current collectors with the short element to affect the said electro-magnetic mechanism and operate the movable elements to one position when the vehicle is operating with "power off" to the motors, means affecting the electro-magnetic mechanism to operate the movable elements to another position when the current collector is in engagement with the said long contact element and out of engagement with the short contact element and only when the vehicle is operated with "power on" the motors, and means rendering the said mechanism ineffective to the engagement of the current collector with the said short element when the mechanism is initially responsive to the engagement of the current collector with the said long element.

4. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, electro-magnetic operated mechanism to operate the movable elements to different positions, a pair of spaced contact elements consisting of a long element and a short element, circuits connecting the said contact elements, electro-magnetic mechanism and current conductors, whereby the engagement of one of the said current collectors with the short element will affect the said electro-magnetic mechanism for operating the movable elements to one position when vehicle is operating with "power off" to the motors and means whereby the electro-magnetic mechanism will operate the movable elements to another position when the current collector is in engagement with the said long contact element and the vehicle is operated with "power on" the motors, and means for preventing operation of the last said means when the current collector is in engagement with the said short element.

5. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, electro-magnetic operated mechanism to operate the said movable elements to different positions, a pair of spaced contact elements consisting of a long element and a short element, circuits connecting the said contact elements, electro-magnetic mechanism and current conductors whereby the engagement of one of the said current collectors with the short element will affect the said electro-magnetic mechanism for operating the movable elements to one position when vehicle is operating with "power off" to the motors, and means whereby the electro-magnetic mechanism will operate the movable elements to another position when the current collector is in engagement with the said long contact element and the vehicle is operated with "power on" the motors, and means for preventing an operation of the mechanism to the first mentioned position when the said long element is initially engaged with the vehicle operating "power on" to the motors.

6. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electrically operated mechanism controlled by the moving vehicle approaching the said frog tongue devices, to operate the movable elements in one direction when controlled with "power on" the motors and in the other direction when the vehicle is operating with "power off" the motors, electrical signals and circuits therefor, contacts associated with each movable element to complete the said circuits for displaying said signals, one of said signals displayed in response to a "power off" operation of the vehicle and another signal displayed in response to a "power on" operation of the vehicle, and means rendering the said mechanism ineffective to operate the said movable elements in the "power off" direction to display the said one signal while the said mechanism is responsive to the vehicle operating with "power on" the vehicle motors to operate the movable elements to display the said another signal.

7. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electro-magnetic mechanism for operating the movable elements to different positions, a pair of contact elements spaced adjacent one of the said current conductors and arranged to be engaged by one of said current collectors, circuits connecting each of the said contact elements, electro-magnetic mechanism and current conductors, the circuit of each contact element being utilized to operate the movable elements to one position or the other, means whereby a current collector of the vehicle engaging the said contact elements may at the will of the operator of the vehicle affect the said electro-magnetic mechanism to operate the movable elements to either of two positions and means for preventing an operation of the said movable elements to one position when the contact members are initially engaged with the vehicle operating "power on" to the motors.

8. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electro-magnetic mechanism for operating the movable elements to different positions, a pair of contact elements spaced adjacent one of the said current conductors and arranged to be engaged by one of said current collectors, circuits connecting each of the said contact elements, electro-magnetic mechanism and current conductors, the circuit of each contact element being utilized to operate the movable elements to one position or the other, means whereby a current collector of the vehicle engaging the said contact elements may at the will of the operator of the vehicle affect the said electro-magnetic mechanism to operate the movable elements to either of two positions, and means for preventing an operation of the said movable elements to one position when one of the said contact members is initially engaged with the vehicle operating "power on" to the motors, and other means for preventing an operation of the said movable elements to another position which each of the contact members are engaged with the vehicle operating "power off" to the motors.

9. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electro-magnetic mechanism for selectively operating the movable elements to different positions in response to an approaching vehicle, contacts to be engaged by the movable tongue elements in either of their operated positions, a plurality of signal indications for indicating the operated positions of the said movable elements, circuits connecting the said current conductors, contacts and signal indications whereby one indication will be displayed when the movable elements are operated to one position and another indication displayed when the movable elements are operated to another position, and means whereby neither of the said indications will be displayed when the movable elements are not operated to corresponding positions.

10. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electro-magnetic mechanism for selectively operating the movable elements to different positions in response to an approaching vehicle, different signal indications indicating each operated position of the said movable elements, separate circuits for each signal and completed only when the said movable elements are operated to corresponding positions for energizing one or other of the said signal indications, and means whereby each circuit will be retained incomplete should the movable elements be improperly operated to conflicting positions.

11. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, and electro-magnetic mechanism for operating the movable elements to different positions, different signal indications for indicating each operated position of the movable elements, contacts associated with each of the said movable elements and employed to complete different circuits for each indication when the movable elements are operated to corresponding positions, the said circuits connecting the contacts of the said movable elements such that when one circuit is completed the other indication circuit will be disconnected from both the feeding power line and the return power line.

12. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electrically operated mechanism controlled by the moving vehicle approaching the said frog tongue devices, to operate the movable elements in one direction when operating with "power on" the motors and in the other direction when the vehicle is operated with "power off" the motors, signal indications to indicate when the movable elements are operated to corresponding positions, and independent electric circuits for each indication selectively energized when the said movable elements are selectively actuated to corresponding positions.

13. In a vehicle operating system comprising a moving vehicle, a double power line, one power line providing a feeding source while the other power line provides a return source, current collectors engaging each power line for collecting motive power for the said vehicle, trolley frog tongue devices equipped with movable elements included in each of the said power lines for directing the course of travel of the said current collectors, electro-magnetic operated mechanism including a plurality of coils to operate the movable elements, a pair of parallel contact elements included in one of the said power lines and positioned to be successively engaged by one of the said current collectors to control the operation of the said electro-magnetic means, one of said said contact elements being electrically connected to the power line including the said contact elements through one group of the said operating coils, while the other contact element is connected to the other power line through another group of said coils, means whereby a current collector engaging the contact elements will connect both groups of operating coils in series between the said power lines and energize but one group of said coils sufficiently to actuate the said movable elements to one position, and means whereby the said operating coils may be energized to selectively actuate the said movable elements to their other operable position when the current collector is in engagement with the said contact elements depending upon whether the vehicle is operated with "power on" or "power off" to the motors at such time.

14. In a vehicle operating system comprising a moving vehicle, a double power line, one power line providing a feeding source while the other power line provides the return source, current collectors engaging each power line for collecting motive power for the said vehicle, trolley frog tongue devices equipped with movable current carrying elements included in each of the said power lines for directing the course of travel of the said current collectors, electro-magnetic operated mechanism to operate the movable elements, a pair of contact elements included in one of the said power lines to be simultaneously engaged by one of the said current collectors approaching the frog tongue devices to control the selective operation of the said mechanism, circuits connecting the contact elements, electro-magnetic operated mechanism and trolley wires whereby simultaneous engagement of the said current collector with each of the said contact elements while the vehicle is operating with "power off" the motors will automatically set the said movable elements to one position, and means effective only while the said current collector is in engagement with only one of said contact elements whereby the operator of the vehicle may selectively operate the movable elements to another position.

15. In a vehicle operating system comprising a moving vehicle, a double power line, one power line providing a feeding source while the other power line provides the return source, current collectors engaging each power line for collecting motive power for the said vehicle, trolley frog tongue devices equipped with movable elements included in each of the said power lines for directing the course of travel of the said current collectors, an electro-magnetic operated mechanism to operate the said movable elements to different positions, a pair of parallel contact elements consisting of a long element and a short element, circuits connecting the said contact elements, mechanism and current conductors, whereby the simultaneous engagement of one of the said current collectors with both the short and long contact elements will affect the said electro-magnetic mechanism for operating the movable elements to one position only when the vehicle is operating at such time with "power off" to the motors, and means effective only when the current collector is in engagement with the said long contact element and out of engagement with the short contact element, whereby the operator of the vehicle may selectively operate the movable elements to another position by operating the vehicle with "power on" the motors at such time.

16. A control system comprising, in combination, a pair of spaced trolley wires of opposite polarity, a switching device associated with each trolley wire to guide current collectors on a moving vehicle at a turnout point, a movable element on each switching device arranged to be moved in two directions, an electrically operated mechanism for each movable element responsive to a vehicle approaching the said mechanisms to move the said elements in one direction when the vehicle is operated with "power on" the motors, and in the other direction when the vehicle is operated with "power off" the motors, and means effective while the said mechanisms are operated in response to a "power off" operation of the vehicle, to maintain the said movable elements nonresponsive to further operation by the said mechanisms in the event the vehicle changes its operation to "power on" the motors while the mechanisms are operating in response to the initial "power off" operation of the vehicle.

17. A control system comprising, in combination, a pair of spaced trolley wires of opposite polarity, a switching device associated with each trolley wire to guide current collectors on a moving vehicle at a turn-out point, a movable element on each switching device arranged to be moved in two directions, an electrically operated mechanism for each movable element controlled by the moving vehicle to move the said elements in one direction when operating with "power on" the motors and in the other direction when the vehicle is operated with "power off" the motors, each mechanism comprising a "voltage" coil for "power off" operation and a "current" coil for "power on" operation, a trolley contacting device associated with one of the said trolley wires comprising parallel contact members of unequal lengths insulated from each other and the trolley wire and arranged to be engaged by one of the said current collectors on the moving vehicle, and conductors directly connecting the electrically operated mechanisms with the trolley wires and contact members to supply current to the operating coils of the said electrically operated mechanisms.

18. A control system comprising, in combination, a pair of spaced trolley wires of opposite polarity, a switching device associated with each trolley wire to guide current collectors on a moving vehicle at a turn-out point, a movable element on each switching device arranged to be moved in two directions, an electrically operated mechanism for each movable element controlled by the moving vehicle to move the said elements in the desired direction only depending upon the vehicle operating with "power on" or "power off" the motors, each mechanism comprising a "voltage" coil for "power off" operation and a "current" coil for "power on" operation, a trolley contacting device associated with one of the said trolley wires comprising parallel contact members insulated from each other and the trolley wire and positioned to be engaged by one of the current collectors on the moving vehicle, and conductors directly connecting the electrically operated mechanisms with the trolley wires and contact members, to supply current to the operating coils of the said electrically operated mechanism, and means for supplying operating current to the "current" coils before the said "voltage" coils, and means rendering the energization of the "voltage" coils ineffective to operate the movable elements when the said "current" coils are energized.

19. A control system comprising, in combination, a pair of spaced trolley wires of opposite polarity, a switching device associated with each trolley wire to guide current collectors on a moving vehicle at a turn-out point, a movable element on each switching device arranged to be moved in two directions, an electrically operated mechanism for each movable element controlled by the moving vehicle to move the said elements in one direction only when operating with "power on" the motors and in the other direction only when the vehicle is operated with "power off" the motors, each comprising a "voltage" coil and a "current" coil, a trolley contactor associated with one of the trolley wires comprising parallel contact members insulated from each other and from the trolley wire and positioned to be engaged by one of the said current collectors, and connections from the contact members to the operating coils of the said electrically operated mechanisms for conducting operating current thereto, means permitting energization of the "current" coils before the said "voltage" coils, and means effective only when the "current" coils are first energized to prevent further operation of the said movable elements when the "voltage" coils are energized.

20. A control system comprising, in combination, a pair of spaced trolley wires of opposite polarity, a switching device associated with each trolley wire to guide current collectors on a moving vehicle at a turn-out point, a movable element on each switching device arranged to be moved in two directions, an electrically operated mechanism for each movable element energized in response to a moving vehicle to operate the said elements in the desired direction depending upon the vehicle operating with "power on" or "power off" the motors, a trolley contactor associated with one of the trolley wires comprising adjacent contact members insulated from each other and from the trolley wire, arranged to be engaged by a current collector, and connections directly from the contact members to the electrically operated mechanisms to control the energization of the said mechanisms, and means effective only when the mechanisms are energized in response to a vehicle operating with "power on" to prevent operation of the said elements to the "power off" position.

21. A switch operating system comprising, in combination, a pair of spaced trolley wires of opposite polarity, a switching device associated with each trolley wire to guide current collectors on a moving vehicle at a turn-out point, each switch having a movable tongue to guide the current collectors on a moving vehicle across the switch in a predetermined relation thereto, an electrically operated mechanism for each movable element comprising two magnet coils to move the tongues to their different positions, a pair of parallel contact members associated with one of the trolley wires insulated from each other and from the trolley wire with which associated, the corresponding coils of the two mechanisms arranged in pairs and connected in series, one of the magnet coil pairs having one of its ends connected to one of the trolley wires and the other end connected to a contact member associated with the other trolley wire, the other pair of coils having one of its ends connected to one of the trolley wires and to the other contact member associated with that trolley wire respectively, whereby a current collector engaging the contact members with "power on" the motors will move the said tongues in one direction only and in the other direction only when the contact members are engaged by the current collector of a vehicle operated with "power off" the motors, and means effective only when the said other pair of coils are energized in response to a vehicle operating with "power on", to render the energization of the said one pair of coils ineffective to operate the said movable elements.

22. A switch operating system comprising, in combination, a switch associated with a trolley wire and having a movable switch tongue to guide the current collector on an electrically operated moving vehicle across the switch, electrically operated mechanism to move the tongue to different positions, the mechanism having a coil for each position to which the tongue is moved, a trolley contactor having substantially parallel contact members, one for each coil, said members insulated from each other and the trolley wire, conductors directly connecting the coils to a source of power and to their respective contact member, one contact member arranged to be connected to the trolley wire to automatically energize one of said coils whenever the current collector electrically connects the said contact members, and the other contact member arranged to place its connected coil in series with the motors on the vehicle when the contactor is engaged by the current collector with "power on" the motors, and means effective only when the last mentioned coil is connected in series with the vehicle motors to render the said one coil ineffective to operate the said tongue.

23. A switch operating system comprising, in combination, a switch associated with a trolley wire and having a movable switch tongue to guide the current collector on an electrically operated moving vehicle across the switch, electrically operated mechanism to move the tongue to different positions, the mechanism having an operating coil for each position to which the tongue is moved, a trolley contactor having substantially parallel contact members, one for each coil, said members insulated from each other and the trolley wire, conductors directly connecting the coils to a source of power and to their respective contact member, said contact members positioned to be electrically connected whenever engaged by the current collector, one of the said contact members further positioned to be engaged before the collector electrically connects the said members whereby its connected coil may be placed in series with the motors on the vehicle when the contactor is engaged by the current collector with "power on" the motors, in advance of the operation of the other of said coils, and means whereby the movable switch tongue will be operated in only one or other of its operable directions dependent upon the vehicle operating with "power on" or "power off" the motors when the current collector initially engages with the said trolley contactor.

24. A switch operating system comprising, in combination, a pair of spaced trolley switches having movable tongues to control the movement of current collectors on a moving vehicle through the switches, coils associated with each switch to move the tongues to different predetermined positions, trolley wires of different polarities connected to the switches, a pair of overlapped contacts associated with one of the trolley wires and arranged to be engaged by a current collector of the moving vehicle; conductors directly connecting the coils to the contacts and to a source of power, the system operating to selectively energize corresponding coils of the trolley switches when a current collector engages the contact to which the coils are connected to move the tongues to one position, and to energize other corresponding coils of the said trolley switches when the collector simultaneously engages both contacts to move the tongue to another position, and means preventing operation of the said tongues by the energization of the last mentioned coils when the tongues are responsive to the energization of the selectively energized coils.

25. A switch operating system comprising, in combination, a pair of spaced trolley switches having movable tongues to control the movement of current collectors on a moving vehicle through the switches, coils associated with each switch, mechanisms operated by the said coils and associated with each switch to move the tongues to different predetermined positions, trolley wires of different polarities connected to the switches, a pair of overlapped contacts associated with one of the trolley wires and arranged to be engaged by a current collector of a moving vehicle; conductors directly connecting the coils to the contacts and to a source of power, the system operating to selectively energize corresponding coils of the trolley switches when the collector engages the contact to which the coils are connected to move the tongues to one position, and to energize other corresponding coils of the said trolley switches when the collector engages the contact to which they are connected to move the tongues to another position, and means whereby the operator of the vehicle may at will selectively control the movement of the said tongues to either of their operable positions.

26. A switch operating system comprising, in combination, a pair of spaced trolley switches having movable tongues to control the movement of current collectors on a moving vehicle through the switches, coils associated with each switch, mechanisms operated by the said coils and associated with each switch to move the tongues to different predetermined positions, trolley wires of different polarities connected to the switches, a pair of overlapped contacts associated with one of the trolley wires and arranged to be engaged by a current collector of the moving vehicle; conductors directly connecting the coils to the contacts and to a source of power, the system operating to selectively energize corresponding coils of the trolley switches when a current collector engages the contact to which the coils are connected to move the tongues to one position, and to energize other corresponding coils of the said trolley switches when the collector engages the contact to which they are connected to move the tongue to another position, and means whereby the operator of the vehicle may at will selectively control the movement of the said tongues to either of their operable positions, dependent upon the vehicle operating with "power on" or "power off" the vehicle motors.

27. A switch operating system comprising, in combination, a pair of spaced trolley switches having movable tongues to control the movement of current collectors on a moving vehicle through the switches, coils associated with each switch, mechanisms operated by the said coils and associated with each switch to move the tongues to different predetermined positions, trolley wires of different polarities connected to the switches, a pair of overlapped contacts associated with one of the trolley wires and arranged to be engaged by one of the current collectors of the said moving vehicle; conductors directly connecting the coils to the contacts and to a source of power, the system operating to energize corresponding coils of the trolley switches when a current collector of a vehicle operating with "power on" the motors engages the contact to which the coils are connected to move the tongues to one position, and to automatically energize other corresponding coils of the said trolley switches when the collector engages the contact to which they are connected to move the tongue to another position, and means rendering the energization of the last mentioned coils ineffective to operate the tongues when the vehicle is operated with "power on" the motors.

28. A control system comprising, in combination, a pair of trolley switches of opposite polarity, a turn-out switch associated with each wire to guide current collectors on a moving vehicle, a movable tongue on each switch to control the movement of the collectors through the switches, separate electro-magnetic operated mechanisms to move the tongues on the switches, parallel contact devices positioned to be engaged in sequence by a current collector to control the operation of the electro-magnetic means on each switch, and conductors directly connecting the said contact devices, electro-magnetic means and the trolley wires, whereby the operator of the vehicle may set the tongues of each switch to one position when the collector engages only the first contact device, and means whereby the operator of the vehicle may prevent operation of the tongues to the other position when the collector is in engagement with both contact devices.

29. A control system comprising, in combination, a pair of trolley switches of opposite polarity, a turn-out switch, associated with each wire to guide current collectors on a moving vehicle, a movable tongue on each switch to control the movement of the collectors through the switches, separate electro-magnetic operated mechanisms to move the tongues on the switches, parallel contact devices to be engaged in sequence by a current collector to control the operation of the electro-magnetic means on each switch, and conductors directly connecting the said contact devices, electro-magnetic means and the trolley wires, whereby the operator of the vehicle may at will set the tongues of each switch to one position when the collector engages only the first contact device by operating the vehicle with "power on" the motors, and means whereby the tongues will be automatically operated to the other position when the collector is in engagement with both contact devices and the vehicle is operated with "power off" the motors.

30. A control system comprising, in combination, a pair of trolley switches of opposite polarity, a turn-out switch associated with each wire to guide current collectors on a moving vehicle, a moving tongue on each switch to control the movement of the collectors through the switches, separate electro-magnetic operated mechanisms to move the tongues on the switches, overlapped contact devices to be engaged in sequence by a current collector to control the operation of the electro-magnetic means on each switch, and conductors directly connecting the said contact devices, electro-magnetic means and the trolley wires, whereby the operator of the vehicle may at will set the tongues to one position when the collector engages only the first contact device, and means effective only when the tongues are not being operated to the last mentioned position for operating the tongues of each device to their other position only when the collector is in engagement with both contact devices.

31. A control system comprising, in combination, a pair of trolley switches of opposite polarity, a turn-out switch associated with each wire to guide current collectors on a moving vehicle, a moving tongue on each switch to control the movement of the collectors through the switches, separate electro-magnetic operated mechanisms to move the tongues on the switches, contact elements positioned to be simultaneously engaged by a current collector to control the operation of the electro-magnetic means on each switch, one of said elements positioned for engagement with the said current collector in advance of the said simultaneous engagement, and conductors directly connecting the said contact devices, electro-magnetic means and the trolley wires for transmitting operating current thereto, and means selectively controlled by the operator of the vehicle permitting the tongues of each switch to be operated to but one of their operable positions while the collector engages both the said contact devices.

FRANK H. RICHTERKESSING.